No. 636,611. Patented Nov. 7, 1899.
A. R. ANTHONY & C. T. CUNNIUS.
BACK PEDALING BRAKE.
(Application filed May 14, 1898.)
(No Model.) 2 Sheets—Sheet 1.
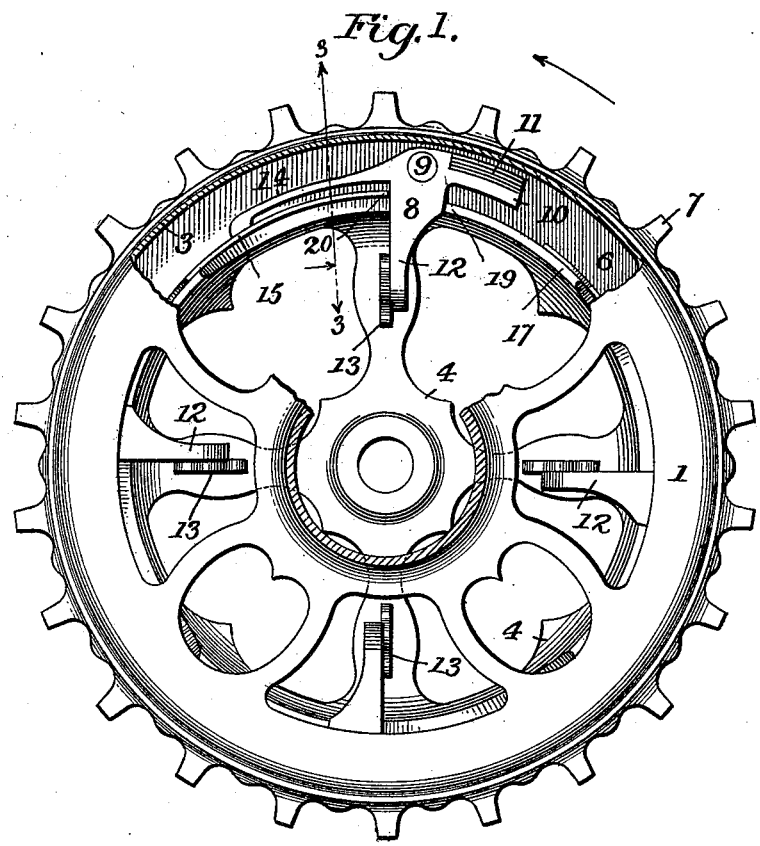
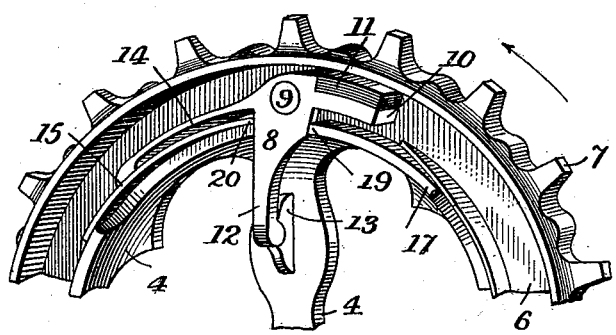
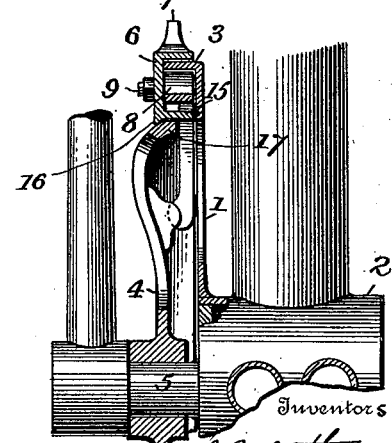

No. 636,611. Patented Nov. 7, 1899.
A. R. ANTHONY & C. T. CUNNIUS.
BACK PEDALING BRAKE.
(Application filed May 14, 1898.)
(No Model.) 2 Sheets—Sheet 2.
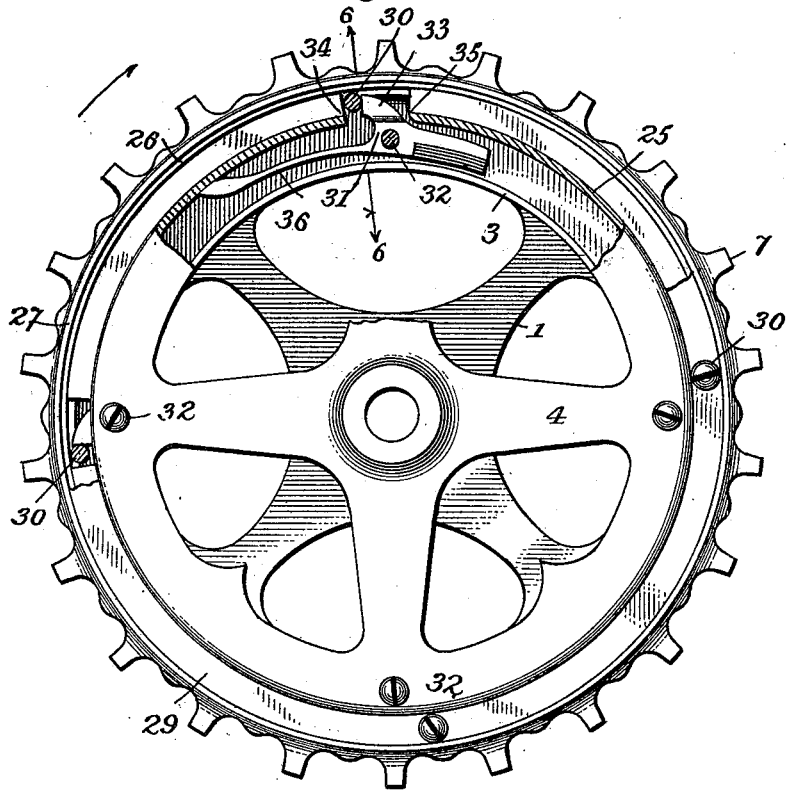
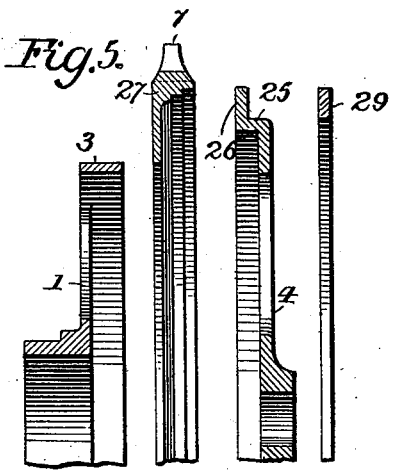
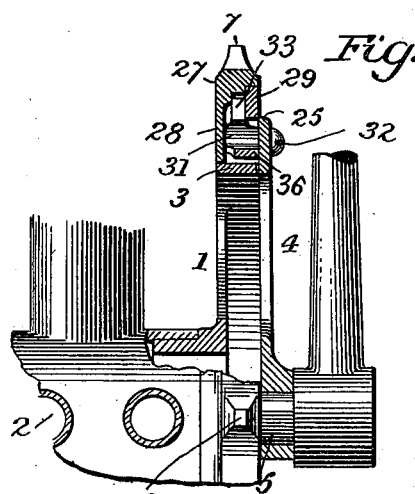
Witnesses
Inventors

UNITED STATES PATENT OFFICE.

ALFRED R. ANTHONY AND CALVIN T. CUNNIUS, OF WILKES-BARRÉ, PENNSYLVANIA.

BACK-PEDALING BRAKE.

SPECIFICATION forming part of Letters Patent No. 636,611, dated November 7, 1899.

Application filed May 14, 1898. Serial No. 680,701. (No model.)

*To all whom it may concern:*

Be it known that we, ALFRED R. ANTHONY and CALVIN T. CUNNIUS, citizens of the United States, residing at Wilkes-Barré, in the county of Luzerne and State of Pennsylvania, have invented certain new and useful Improvements in Automatic Bicycle-Brakes, of which the following is a specification.

Our invention relates to improvements in that class of velocipede-brakes wherein the brake is applied by a backward pressure upon the pedals.

Our improved brake is preferably located entirely within the sprocket-wheel, where it is practically hidden from view and protected from dust.

In carrying out our invention we construct the sprocket-wheel with a two-part rim, of which the part carrying the teeth is movable upon the other part or member, which is fixed to the hub, and we provide one of these members with one or more pivoted brake-levers, each of said levers having an arm adapted to be engaged by the other rim member, so that the relative movement of the two members will operate the lever or levers to apply or release the brake, which acts upon a stationary friction-ring secured to the crank-hanger.

In the accompanying drawings, which illustrate our invention, Figure 1 is a side elevation of a sprocket-wheel, partly broken away, showing the preferred form of our brake. Fig. 2 is a perspective view of part of the sprocket-wheel and brake mechanism, the friction-ring being removed. Fig. 3 is a section on the line 3 3 of Fig. 1, showing also the application of the brake to the bicycle-frame. Fig. 4 is a side elevation of a sprocket-wheel, illustrating a modified form of the brake. Fig. 5 is a detail sectional view, partly broken away, of the friction-ring and the component parts of the sprocket-wheel shown in Fig. 4; and Fig. 6 is a section on the line 6 6 of Fig. 4, showing also the application of the brake to the machine.

In the drawings, Figs. 1 and 3, 1 indicates a spider or frame secured to the crank-hanger 2 and having on its perimeter an outwardly-projecting annular flange 3, which forms the friction-ring of the brake. The sprocket-wheel is formed in two parts—namely, the hub-section 4, which is rigidly secured to the shaft 5, and the section 6, carrying the sprocket-teeth 7, which is movable upon the hub. The rim, as shown, is recessed on the inner side, and the friction-ring 3 projects into this recess. Within the recess is also arranged a series of bell-crank brake-levers 8, which are supported within the rim 6 upon pivots 9. Each of the levers 8 consists of an arm 10, which is provided with a friction-surface 11, composed of rawhide, leather, or any suitable material, and an arm 12, which extends radially inward and normally rests against a projection 13 upon the hub-section 4. As shown, the lever is also provided with a spring-arm 14, which bears upon the lower wall 15 of the recess in the rim and normally tends to hold the brake-shoe out of engagement with the friction-ring. The rim 6 is held upon the perimeter of the hub-section 4 by an inwardly-projecting flange 16, which bears against the front side of the hub-rim 17, and the radially-extended arms 12, which bear against the inner side of said hub-rim.

As many brake-levers may be employed as is found necessary. As shown in the drawings, four such levers are used. The hub-rim 17 and the adjacent wall 15 of the sprocket-rim are cut away, so as to permit the arms 12 of the bell-crank levers to extend through them. The rim 17 is cut away abruptly on the rear side of the arms 12, leaving shoulders 19, which are adapted to press against said arms when the hub of the wheel is pressed forward by the pedals, and the rim 15 is cut away at 20 to permit the levers to move sufficiently to apply the brakes.

In operation, when the pedals are pressed to move the machine in the forward direction (indicated by the arrows) the parts will assume the relative positions shown in Figs. 1 and 2, the shoulders 19 impinging against the rear sides of the arms 12 and forcing the lower ends of said arms against the stops 13 on the hub. The sprocket-rim will then be driven positively by the engagement of the shoulders 19 with the levers and the shoes 11 will be positively held out of engagement with the friction-ring. When no pressure in either direction is exerted upon the pedals, the springs 14 will hold the shoes out of engagement with the friction-ring, and when it is desired to apply the brake a backward pressure is exerted upon the pedals, which has the effect of turning the hub backward within the sprocket-rim. The shoulders 19 will therefore be moved away from the arms 12 and the stops 13 will force said arms backward against the action of the springs 14, and the shoes 11, carried by the arms 10, will be pressed powerfully outward against the inner side of the friction-ring 3. It will be obvious that this braking action will be continued as long as backward pressure is applied to the pedals and will cease as soon as the backward pressure stops.

In the modification shown in Figs. 4, 5, and 6 the brake-levers instead of being pivoted to the sprocket-rim and adapted to bear outwardly against the friction-ring, as in the form above described, are pivoted to the hub-section of the wheel and bear inwardly against the stationary friction-surface. Other slight differences in the mechanical arrangement are shown, but the principle involved is the same in both cases. In these figures the friction-ring 3 is mounted in the same manner as the ring described in the previous figures. The hub-section 4 of the sprocket-wheel extends outward beyond the friction-ring and is offset at 25, the outer part 26 of the hub surrounding the friction-ring and forming a guide, upon which the toothed sprocket-rim 27 is supported. The sprocket-rim is provided on its inner side with an integral flange 28, extending inward nearly to the friction-ring, and a ring 29 upon its outer side, which is removably secured to the sprocket-rim by screws 30. The guide 26 fits within the recess formed by said flanges. The brake-shoe levers 31 are pivoted to the hub-section at equidistant points within the offset 25, being mounted upon suitable pivot-pins 32. The pivot-pins are arranged slightly in advance of the pins 30, which extend across the recess in the sprocket-rim. The guide-flange 26 is cut away for a short distance at the points where the pins 30 pass through, leaving shoulders 34 and 35 on either side of said pins. The arms 33 of the bell-crank brake-levers extend outwardly into the recesses thus formed between the shoulders 34 and 35, and the rear sides of said arms engage the pins 30. The springs 36 bear against the inner side of the guide-flange 26 and the offset portion of the hub and serve to hold the shoe out of engagement with the friction-ring when no pressure is being exerted upon the pedals. When pressure is exerted to move the hub-section 4 in a forward direction, as indicated by the arrow, the shoulders 34 will press against the pins 30 and carry the sprocket-rim with it positively. When, however, a backward pressure is exerted upon the pedals, the hub-section carrying the brake-levers will be moved backward relatively to the sprocket-rim, and the pins 30, pressing against the arms 33, will force the brake-shoe upon the friction-rings against the pressure of the springs 36. As soon as backward pressure is stopped the springs 36 will lift the brake-shoe and the parts will assume about the position shown in Fig. 4.

It will be seen that the mechanism and manner of applying the brake in both forms of our invention are very much the same. In the preferred form, however, (illustrated in Figs. 1, 2, and 3,) the application of the brake is more powerful and the means for removing the brake-shoe from the friction-ring and for driving the sprocket-rim are more positive than in the form shown in the remaining figures.

It will be obvious that changes may be made in the mechanical arrangement of the parts without departing from the spirit and scope of our invention.

What we claim, and desire to secure by Letters Patent of the United States, is—

1. In a brake for velocipedes, the combination with a stationary friction-ring, of a sprocket-rim having an annular recess into which said ring projects, bell-crank brake-levers pivoted within said recess, a hub-section upon which said sprocket-rim is movably mounted, and projections or shoulders upon said hub-section adapted to engage said levers to move them positively in either direction, substantially as described.

2. In a brake for velocipedes, the combination with a stationary friction-ring, of a sprocket-rim having an annular recess into which said ring projects, a brake-lever pivoted within said recess and having an inwardly-projecting arm, a hub-section movable within the sprocket-rim and having a stop arranged to bear against the forward side of said arm, and a shoulder arranged to bear against the rear side of the arm intermediate said stop and the pivotal point of the lever, substantially as described.

3. In a brake for velocipedes, the combination with a stationary friction-ring, and a sprocket-wheel consisting of a toothed rim and a hub-section movable within said rim, of a bell-crank brake-lever pivoted to said rim and having an arm adapted to engage the friction-ring, a spring for normally holding said arm out of engagement with the ring and an arm extending radially inward, a stop on the hub-section in front of said radial arm, and a shoulder in the rear thereof, substantially as described.

In testimony whereof we affix our signatures in presence of two witnesses.

ALFRED R. ANTHONY.
CALVIN T. CUNNIUS.

Witnesses:
W. S. PARSONS,
THEO. RUNIFORD.